United States Patent
Kumar et al.

(10) Patent No.: US 11,841,855 B2
(45) Date of Patent: Dec. 12, 2023

(54) SYSTEM AND METHOD FOR EFFICIENT PROCESSING AND MANAGING OF REPORTS DATA AND METRICS

(71) Applicant: Open Text Corporation, Waterloo (CA)

(72) Inventors: Kancharla Anil Kumar, Bangalore (IN); Syed Nasir Bellary, Bangalore (IN); Sunil Kumar Gollapinni, Bangalore (IN); Lokesh Kumar Nayak, Mahasamund (IN); Mohammad Sameer Pathan, Bengaluru (IN); David Humby, Richmond (CA)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 17/512,413

(22) Filed: Oct. 27, 2021

(65) Prior Publication Data
US 2022/0129462 A1    Apr. 28, 2022

Related U.S. Application Data

(60) Provisional application No. 63/106,429, filed on Oct. 28, 2020.

(51) Int. Cl.
*G06F 16/2453* (2019.01)
*G06F 9/54* (2006.01)
*G06F 16/22* (2019.01)

(52) U.S. Cl.
CPC ......... *G06F 16/24537* (2019.01); *G06F 9/54* (2013.01); *G06F 16/2282* (2019.01)

(58) Field of Classification Search
None
See application file for complete search history.

(56) References Cited

U.S. PATENT DOCUMENTS

| | | | |
|---|---|---|---|
| 7,802,137 B2 * | 9/2010 | Kawamura | G06F 11/2074 714/15 |
| 9,460,171 B2 * | 10/2016 | Marrelli | G06F 16/258 |
| 2008/0034055 A1 * | 2/2008 | Das | G06Q 10/10 709/217 |
| 2015/0134589 A1 * | 5/2015 | Marrelli | G06F 16/254 707/602 |

* cited by examiner

*Primary Examiner* — Kim T Nguyen
(74) *Attorney, Agent, or Firm* — Sprinkle IP Law Group

(57) ABSTRACT

Systems and methods for data reporting using a data aggregator and a data retrieval tool such as a file intelligence service. The data aggregator stores two sets of data reporting tables and designates a first one of the sets of tables as an active set and the second one of the sets as a non-active set. The active set of tables stores data corresponding to a most recently successfully completed search. The non-active set stores data retrieved by the data retrieval tool from disparate data sources according to current search. The data in the active set of tables is immediately available for use in requested reports. When the data aggregator completes the current search, it designates the non-active set of tables as the active set so that the data therein becomes available for use in requested reports.

20 Claims, 8 Drawing Sheets

| id<br>[PK] uuid | date_run<br>timestamp with time zone | repository_type<br>character varying (500) | status<br>character varying (500) | active_table<br>integer |
|---|---|---|---|---|
| 89e05f94-2750-4281-876d-7930f3bb2767 | 2020-08-03 01:00:00.029+05:30 | OTFI | SUCCESS | 1 |
| 0e94f478-3aa0-413a-b087-4216772f441a | 2020-08-10 01:00:00.033+05:30 | OTFI | SUCCESS | 2 |
| 73e39ffc-954e-479a-8ad9-e3fbd9396410 | 2020-08-17 01:01:01.82+05:30 | OTFI | FAILURE | 1 |
| fa0abc7e-6db8-42eb-bdad-dcd451aa1efd | 2020-08-24 01:00:00.042+05:30 | OTFI | SUCCESS | 1 |
| 50d87ddc-ad14-47a5-b3b3-99096d492a12 | 2020-08-31 01:00:03.683+05:30 | OTFI | SUCCESS | 2 |
| 9dfb773a-c087-4454-b7ce-a7d8d44a5706 | 2020-09-07 01:00:00.467+05:30 | OTFI | FAILURE | 1 |
| 0ca96c6b-0d7f-4379-933d-22a248afa6ea | 2020-09-14 01:01:02.102+05:30 | OTFI | FAILURE | 1 |
| 2c360b7e-bdc0-4368-a42b-5228e12bf67a | 2020-09-21 01:00:00.028+05:30 | OTFI | SUCCESS | 1 |

SYSTEM AND METHOD FOR EFFICIENT PROCESSING AND MANAGING OF REPORTS DATA AND METRICS

RELATED APPLICATIONS

This application claims priority under 35 U.S.C. § 119(e) to U.S. Provisional Application No. 63/106,429, entitled "System and Method for Efficient Processing and Managing of Reports Data and Metrics", filed Oct. 28, 2020, which is fully incorporated herein by reference for all purposes.

TECHNICAL FIELD

The invention relates generally to systems and methods for compliance data reporting, and more particularly to systems and methods for aggregating reporting data to maintain tables from a most recent successful search, storing results of a new search in alternate tables, and designating the alternate tables as current tables upon successful completion of the new search.

BACKGROUND

Large organizations with independent and geographically-dispersed business units, commonly use many different types of business software applications and deploy multiple repositories to store data in support of the applications. Each of the repositories may evolve to have unique configurations and may be subject to various records policies. Over time, records policies may become more complex as new data privacy regulations are introduced. As the risk profile for the repositories rises, there is an increasing need for centralized governance processes to prevent gaps and inconsistencies with respect to the enforcement of the records policies.

Systems which are implemented for this purpose, which will be referred to herein as federated compliance systems, help organizations achieve centralized and automated management and oversight of records policies, and can enable visibility across multiple repositories of different types to provide transparency and defensibility of organizational information governance and reporting processes. Federated compliance systems may provide flexibility in the management of repositories that include both on-premise repositories and cloud repositories. While records policies may be enacted locally, federated compliance systems can allow operational control of the different repositories to be centralized, thereby reducing scalability issues.

Another problem that may be experienced by large organizations is that, because of the vast amounts of information they may store, the organizations may not know exactly where documents are stored, and what specific information is contained in the documents. Users create files (e.g., word processing documents, spreadsheets, presentations) every day, and these files may be duplicated and stored multiple times in multiple locations. These files may include sensitive and regulated information (e.g., personally identifiable information and payment card information) which is subject to records policies which are difficult to enforce on this unmanaged organizational content. "File intelligence" systems have therefore been developed to address this problem. "File intelligence" is used herein to refer to systems that index, identify and tag information for reporting purposes. These file intelligence systems can be deployed and used to catalog unmanaged sources (e.g., file shares, email, etc.), identify and analyze content files and support management of critical, sensitive and/or valuable content. File intelligence systems can be used, for example, to provide access to different repositories, tag, map, search and visualize organizational data, and identify content with sensitive data and assist automated compliance with content and metadata-based rules.

While federated compliance systems and file intelligence systems make it easier for organizations to deal with the management of growing amounts of data in repositories, there are problems that arise from the use of these systems which have not yet been solved. One of these problems concerns the amount of time that it takes for the systems to obtain data which may be needed by a user. In other words, these systems may provide data or reports which are very useful in the management of the data and ensuring compliance to records policies, but the amount of time that it takes for the systems to obtain this information may be great enough that a user's request for the information times out, or the user gives up on the request before the responsive data has been provided. In either event, the user has not been able to obtain the benefits provided by the systems. Embodiments disclosed herein address this problem by reducing the amount of time that is required to provide data responsive to a user's request, even though the process of retrieving the required data may take a great deal of time.

SUMMARY

The present disclosure details systems, methods and products for an aggregator service that is implemented in an off-cloud environment. The aggregator service works with a federated compliance service and a file intelligence service to retrieve and cache data from repositories that store an organization's data for reporting, so that the data can be quickly and easily accessed by a user without causing delays that may result in timeouts or other interruptions of the reporting process. In one embodiment, the aggregator service periodically searches and retrieves data from the repositories and stores the data in one of two tables. The table that stores the most recent successful search results is identified as the active table, and the other (non-active) table is cleared so that it can be used to store data resulting from a subsequent search. When a new search is conducted and the results are successfully stored in the non-active table, the system is updated to indicate that the table having the newly stored data is the active table and the table having the older data is the non-active table. When data for a report is requested, the system determines which of the tables is active, and retrieves the data from the table without having to wait for a search to be conducted.

One embodiment comprises a system for data reporting that includes a data aggregator and a data retrieval tool coupled to the aggregator, where the data retrieval tool may be a file intelligence service. The data aggregator is adapted to store two sets of data reporting tables and to designate a first one of the sets of tables as an active set and the second one of the sets as a non-active set. The active set of tables stores data corresponding to a most recently successfully completed search, and the non-active set stores data corresponding to a current search, where in response to successful completion of the current search, the data aggregator designates the non-active set as the active set. The data retrieval tool (e.g., file intelligence service) is adapted to receive search requests from the data aggregator, retrieve data corresponding to each of the search requests from one or more data sources coupled to the data retrieval tool, and return to the data aggregator the retrieved data corresponding to each received search request. These search requests are received independent of a specific request for a report, and are performed before a report is requested so that the data aggregator will already have the data available when a report is requested. The data aggregator is adapted to receive data requests and, for each of the received data requests, identify the active set of data reporting tables containing requested data, retrieve the requested data from the active set of data reporting tables, and provide the requested data responsive to the data request.

In some embodiments, the data retrieval tool comprises a file intelligence service which is adapted to provide an application program interface (API) and to receive the search requests from the data aggregator via the API. The file intelligence service may be adapted to store in a file intelligence database one or more tables identifying the one or more data sources, the file intelligence service retrieving the data corresponding to the search requests from the one or more data sources identified by the one or more tables.

In some embodiments, the data aggregator is adapted to store a record corresponding to each search request in a search table, the record indicating at least a time at which the search corresponding to the search request was run. Each record in the search table may also store an indicator of success or failure of the corresponding search and an indicator of the active set of tables following completion of the corresponding search. In some embodiments, the data aggregator is adapted to clear the previously active set of tables following designation of the non-active set as the active set.

In some embodiments, the system may include a scheduler coupled to the data aggregator, where the scheduler is adapted to store a set of reporting jobs. Each reporting job identifies one or more corresponding data requests and one or more scheduled times for the data requests, and the scheduler is adapted to initiate each of the data requests with the data aggregator at scheduled times corresponding to the data requests. In some embodiments, one or more of the data requests is repeatedly initiated at intervals determined by corresponding ones of the reporting jobs.

In some embodiments, the data sources from which data is retrieved comprise two or more distinct data stores that are remote from the data aggregator. These data sources may comprise both cloud-based and off-cloud data stores. In some embodiments, the two sets of data reporting tables are stored in a data store local to the data aggregator.

In some embodiments, the data aggregator is adapted to store one or more search configurations, each search configuration defining parameters for a corresponding one of the search requests. In response to initiation of a data request, the data aggregator is adapted to provide a corresponding one of the search requests to the data retrieval tool according to the corresponding search configuration. The data aggregator may also be adapted to store one or more report configurations, each report configuration defining parameters for a corresponding data report based on a corresponding data request. A report is then generated according to the corresponding report configuration in response to receiving the requested data.

An alternative embodiment comprises a method for data reporting. In this method, a data aggregator stores two sets of data reporting tables, designating a first one of the sets as an active set and the second one of the sets as a non-active set. The active set of tables store data corresponding to a most recently successfully completed search, and the non-active set store data corresponding to a current search. The method further comprises the data aggregator designating the non-active set as the active set in response to successful completion of the current search. Further, a data retrieval tool receives search requests from the data aggregator and retrieves data corresponding to each of the search requests from one or more data sources coupled to the data retrieval tool. The retrieved data corresponding to each received search request is then returned to the data aggregator. When the data aggregator receives data requests and, for each of the received data requests, identifies the active set of data reporting tables containing requested data, retrieves the requested data from the active set of data reporting tables, and provides the requested data responsive to the data request.

Another alternative embodiment comprises a computer program product for data reporting which includes a non-transitory computer-readable medium storing instructions executable by one or more processors to perform a method as described above.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 7 is an exemplary structure of search table in accordance with some embodiments.

DETAILED DESCRIPTION

Figure 1:
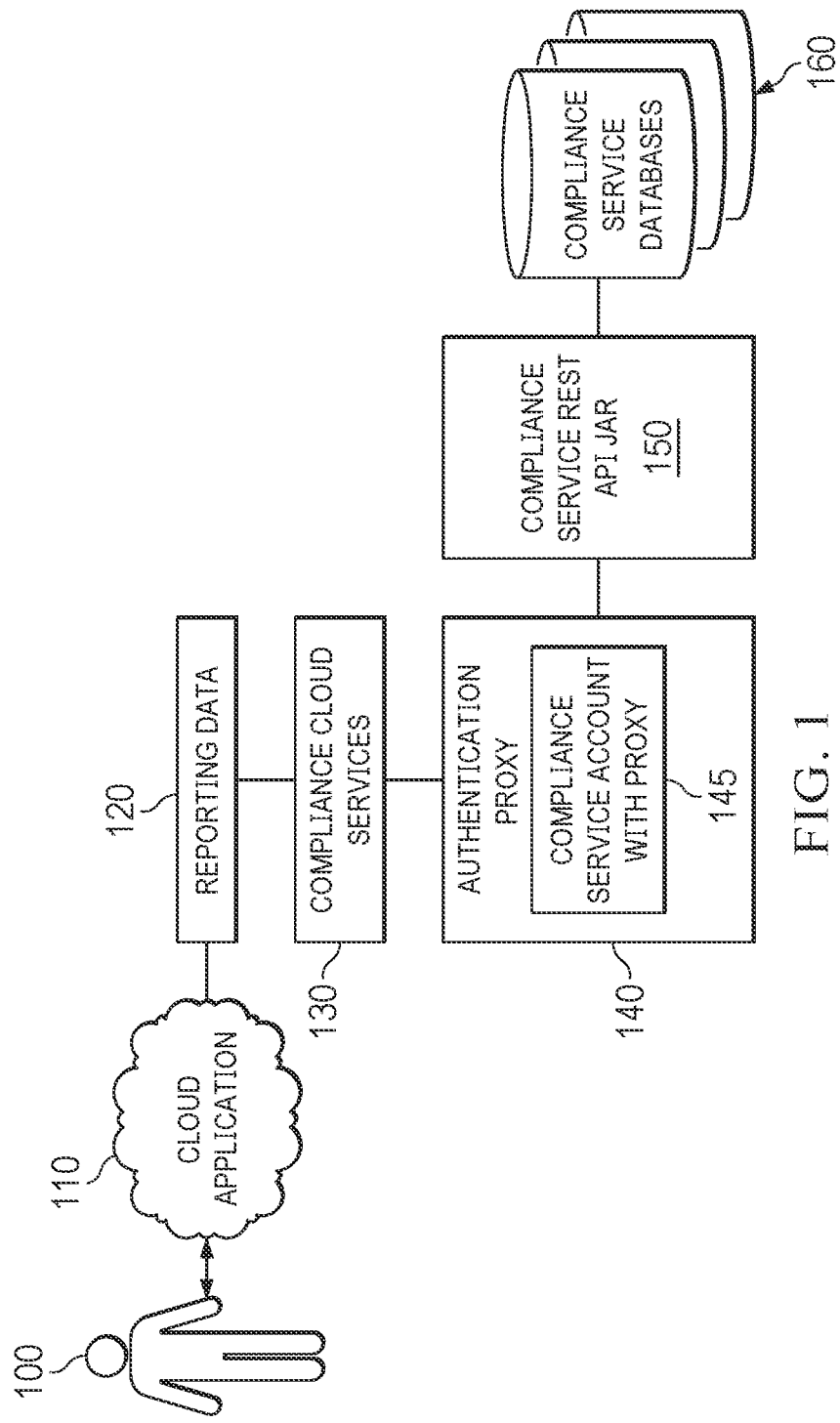
FIG. 1 is a diagram illustrating a system for gathering reporting data in accordance with the prior art.

Embodiments and the various features and advantageous details thereof are explained more fully with reference to the non-limiting embodiments that are illustrated in the accompanying drawings and detailed in the following description.

Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein address difficulties encountered in prior art compliance reporting systems, particularly the amount of time that is often required to gather the data which is required for compliance reporting, and the resulting problems that may arise, such as users' requests for reporting data timing out, or the users simply giving up on the requests before the data responsive to the requests has been provided.

Embodiments disclosed herein enable users to very rapidly, if not immediately, obtain requested compliance reporting data, despite the lengthy process of amount of time that may be required to retrieve the required data may take a great deal of time.

The invention relates generally to systems and methods for compliance data reporting, and more particularly to systems and methods for aggregating reporting data to maintain tables from a most recent successful search, storing results of a new search in alternate tables, and designating the alternate tables as current tables upon successful completion of the new search.

Federated compliance systems and file intelligence systems make it easier for organizations to deal with the management of growing amounts of data in repositories, but these systems still have shortcomings. For instance, one problem is that the amount of time that it takes for existing systems to obtain reporting information may be great enough that a user's request for the information times out. Even if the request is not timed out by the system itself, it may take so long that the user believes the request has failed and aborts the request before the responsive data has been provided. In either event, the user has not been able to obtain the desired data. Embodiments disclosed herein address these problems by reducing the amount of time that is required to provide data responsive to a user's request, even though the process of retrieving the required data may take a great deal of time.

One embodiment of the invention disclosed herein is an aggregator service that is implemented in an off-cloud environment. The aggregator service works with a federated compliance service and a file intelligence service to retrieve and cache data from the repositories that store an organization's data for reporting so that the data can be quickly and easily accessed by a user without causing delays that may result in timeouts or other interruptions of the reporting process. In one embodiment, the user accesses a file intelligence interface of a federated compliance service to request select one or more reports that have been configured for the file intelligence service.

Previously, the request would be provided to the file intelligence service, which would access the organization's data in one or more repositories, searching for and obtaining the data for the requested report(s) so that it could be returned to the user. As noted above, the process of searching and retrieving the data can potentially take a great deal of time and can cause the request to time out, or the user may simply assume that the system is not being responsive, and may cancel the request before the requested information is returned.

In the present embodiments, however, the data has previously been searched and retrieved, and then stored so that it can be immediately returned to the user when requested. In order to accomplish this, the aggregator service uses a scheduler to periodically perform the searches and retrieve the corresponding data for a set of reports that are defined by the file intelligence service. The aggregator service maintains two tables for each of the reports, one of which is active, and one of which is non-active. The active table stores the most recent successful download of the data for the requested report, while the non-active table is available for storing newly retrieved data. When a scheduled search/retrieval of data for a report is performed, the data is stored in the corresponding non-active table. When all of the data for the report has been successfully stored in the table, the aggregator service stores an indicator that this table is now the active table for the report, and the previously active table becomes the non-active table. The now non-active table can then be cleared and used to store the next set of data which is retrieved for the report.

Referring to FIG. 1, a diagram illustrating a system for gathering reporting data in accordance with the prior art is shown. This example system is configured to obtain reporting data in response to a request by a user 100. The user logs into a cloud-based compliance application 110 and submits a request for one or more reports (e.g., compliance reports). Cloud-based application 110 enables user 100 to access compliance services that track and organize records and manage content retention and metrics. These compliance services may track and manage data across multiple repositories (both on-cloud and off-cloud) in order to provide the desired capabilities for information governance.

Cloud based compliance application 110 is configured to access a data reporting component 120, which may have the capability of displaying metrics and data based on configured report templates. After user 100 logs into application 110, the user may navigate to data reporting component 120 in order to view available reports on the system's compliance metrics and data. Data reporting component 120 can then access the compliance cloud services 132 request data for the reports the user wishes to view. Compliance cloud services 130 passes the request to an off-cloud authentication proxy 140, and the authenticated complaint service account proxy 145 calls the compliance service API 150 to fetch the data for the desired reports.

In order for the compliance system to retrieve the data, it must scan all of the associated databases 160 which may store the requested data. This will normally include the entire range of compliance databases, and may be a very time-consuming operation, since there may be millions of records that are available in the compliance system. When the compliance system finds the requested data, the data is returned via compliance services API 152 authentication proxy 140. Authentication proxy 140 in turn returns the requested data to compliance cloud services 130, which will forward the data to data reporting component 120. The requested reports are generated using the received data, and the reports are returned from cloud-based compliance application 110 to user 100.

Figure 2:
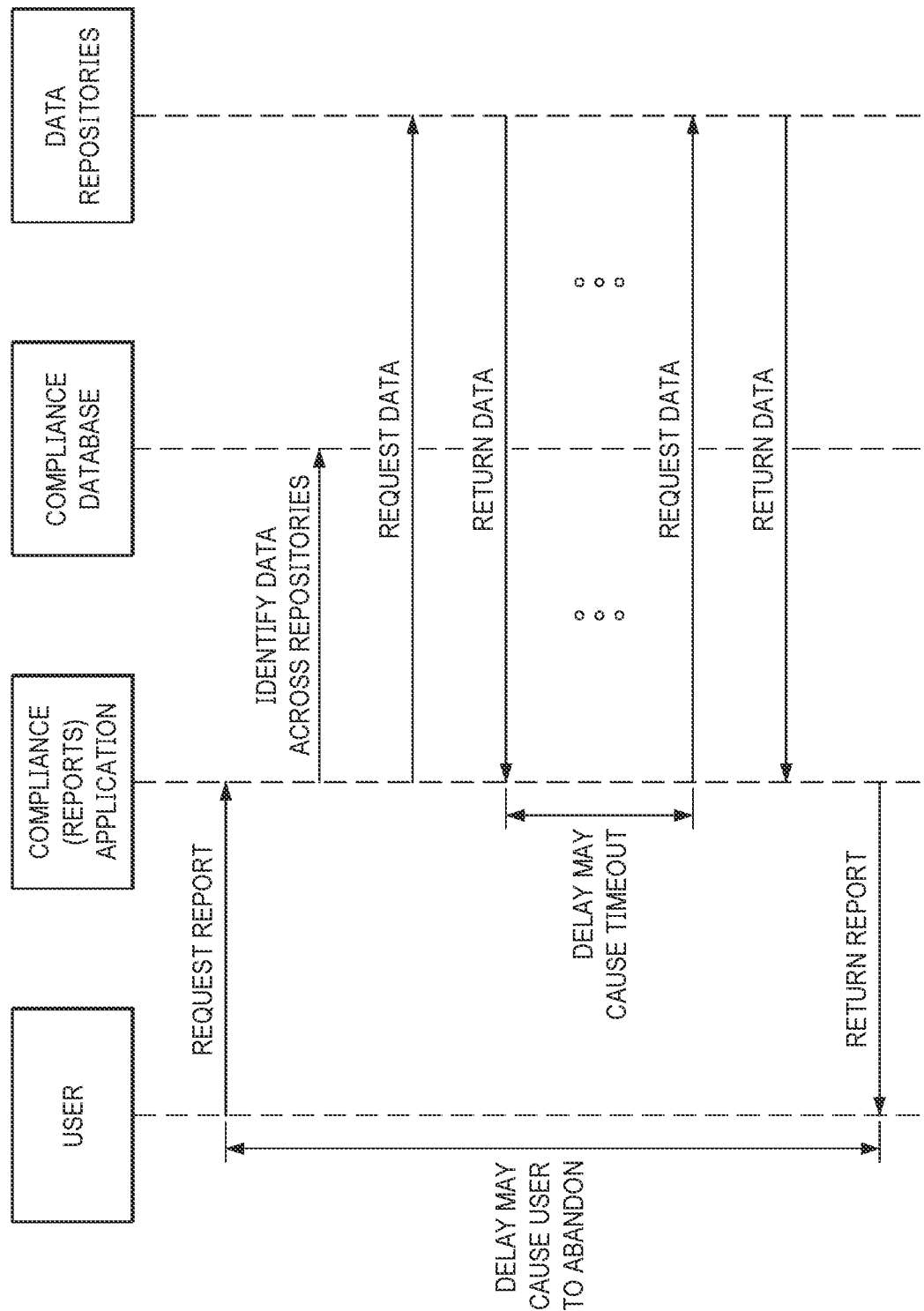
FIG. 2 is a diagram illustrating the overall operation of the system of FIG. 1.

Referring to FIG. 2, a diagram illustrating the overall operation of the system of FIG. 1 is shown. As depicted in this figure, a user requests a report (or multiple reports) from the compliance application. Based on the request, the compliance application identifies in the compliance database data that is required for the requested report(s). The data for the reports is then requested from each of the respective data repositories that store the data. As noted above, this may require scanning all available databases to retrieve the requested data, so multiple requests and data returns are depicted in the figure. When all of the requested data has been returned to the compliance reporting application, the requested reports are generated, and the reports are returned to the user.

As noted above, it may take a great deal of time to scan and retrieve all of the data from the different repositories in which the data may be stored. In some cases, the delay may be sufficient to cause the system itself (or one of the components involved in the process) to timeout, causing the process to fail. This delay is noted in the figure. In addition to the possibility of a timeout in the system causing the data request to fail, the user may believe that the delay is actually a failure of the request, and the user may abort the request so that it cannot be successfully completed. This is also noted in the figure. Embodiments of the present invention are intended to avoid failures resulting from system timeouts or user-aborted requests.

Figure 3:
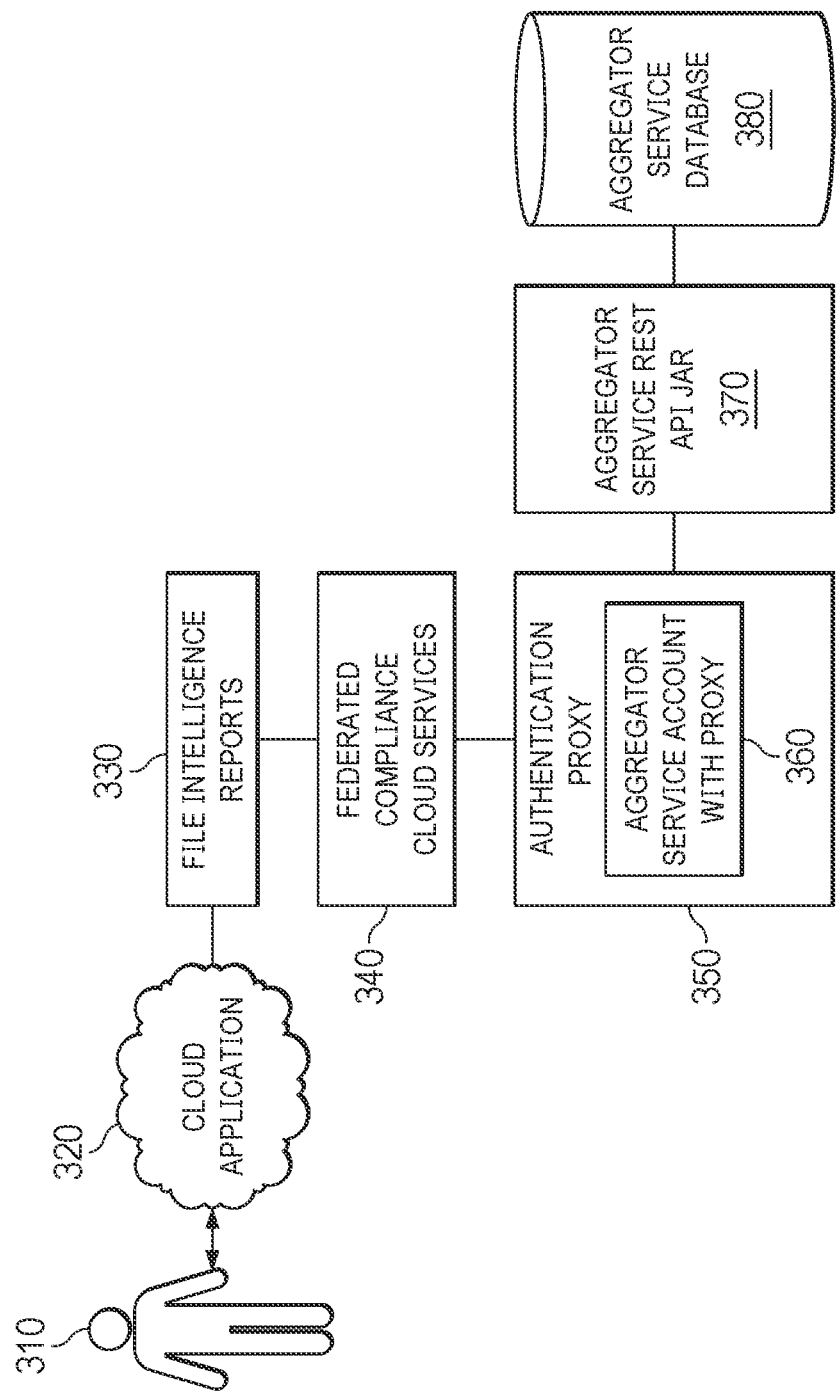
FIG. 3 is an exemplary embodiment of a federated compliance system configured in accordance with one embodiment.

Referring to FIG. 3, an exemplary embodiment of a federated compliance system configured in accordance with one embodiment is shown. In this embodiment, an end user 310 accesses a federated compliance application 320 and access a file intelligence interface 330 of the application to request one or more reports. Interface 330 is configured to access on-cloud federated compliance service 340 to forward request for data for the requested reports. The federated compliance service 340 is configured to access authentication proxy 350 of aggregator service 360. Aggregator service 360 uses aggregator service Rest API 370 to access tables in Aggregator service database 380 which stores the data for the requested reports in corresponding tables.

One of the primary differences between the system of FIG. 3 and the system of FIG. 1 is that when a request for data is serviced by the system, it is serviced using reporting data that has already been retrieved from various sources and has been stored in the database of the aggregator service. Consequently, when the request for data is received, it can be immediately serviced using the data in the aggregator service database, rather than having to retrieve the data from the different data sources, which can be very time-consuming. Then, since the data is immediately available, the system will not timeout while waiting for data to be retrieved, and the user will not abort the request because of delays in servicing the request. This is illustrated in FIG. 4.

Figure 4:
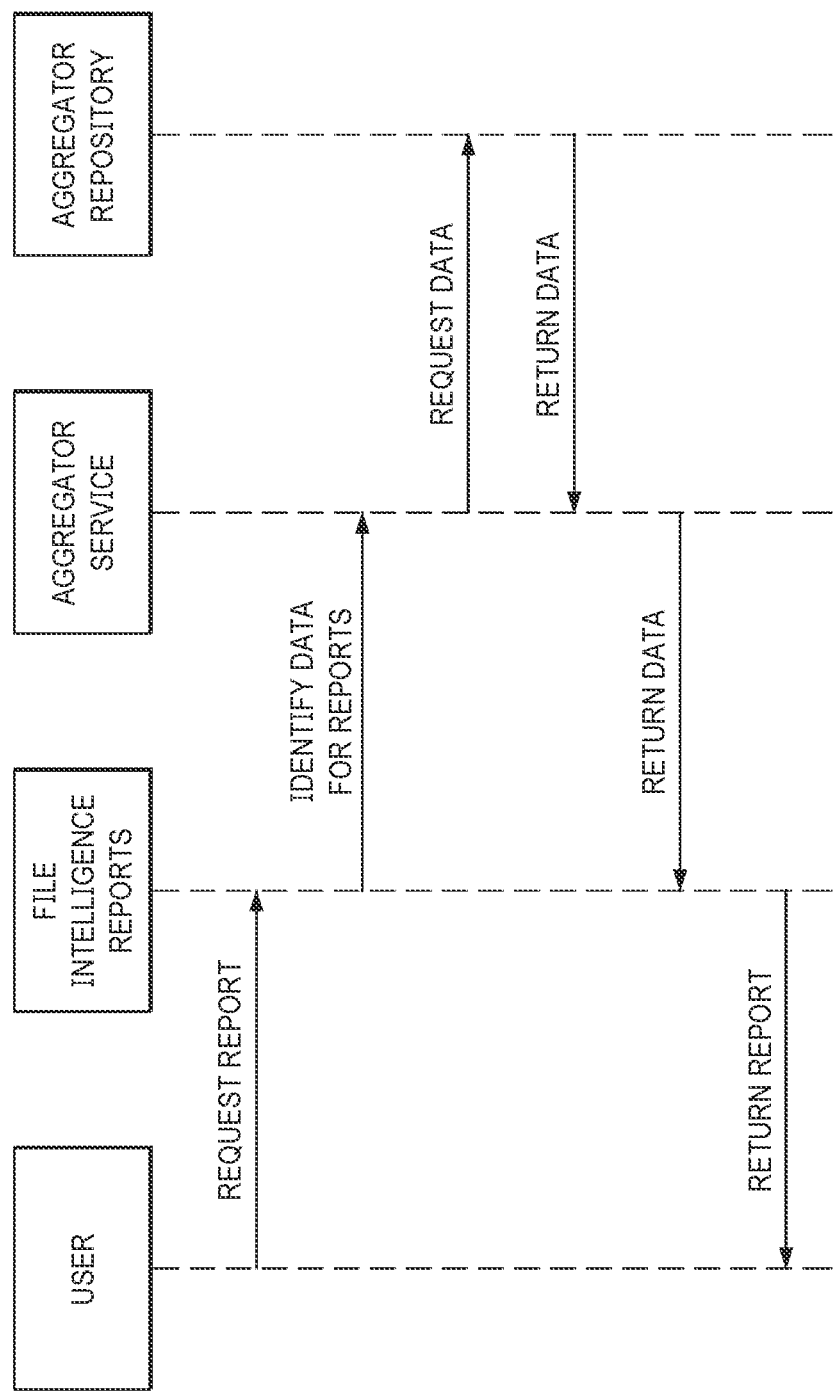
FIG. 4 is a diagram illustrating the overall operation of the system of FIG. 3 in accordance with some embodiments.

Referring to FIG. 4, a diagram illustrating the overall operation of the system of FIG. 3 is shown. As depicted in this figure, a user requests a report from a file intelligence reporting component of the compliance application. Based on the user's request for the report, the updated data needed for the report is identified, and the data is requested by the aggregator service. The aggregator service retrieves the necessary data from the repository of the aggregator service, which contains current data corresponding to the requested report.

The data in the aggregator repository was obtained in a previously completed search that res was initiated by a scheduler, independent of the user's request for the report or the resulting data request by the aggregator service to retrieve data for the requested report. This will be explained in more detail below.

After the aggregator service obtains the data necessary for the desired report from the aggregator repository, the data is returned to the reporting component of the compliance application. The reporting component generates the desired report using the data retrieved from the aggregator repository and returns the report via the compliance application to the user.

Figure 5:
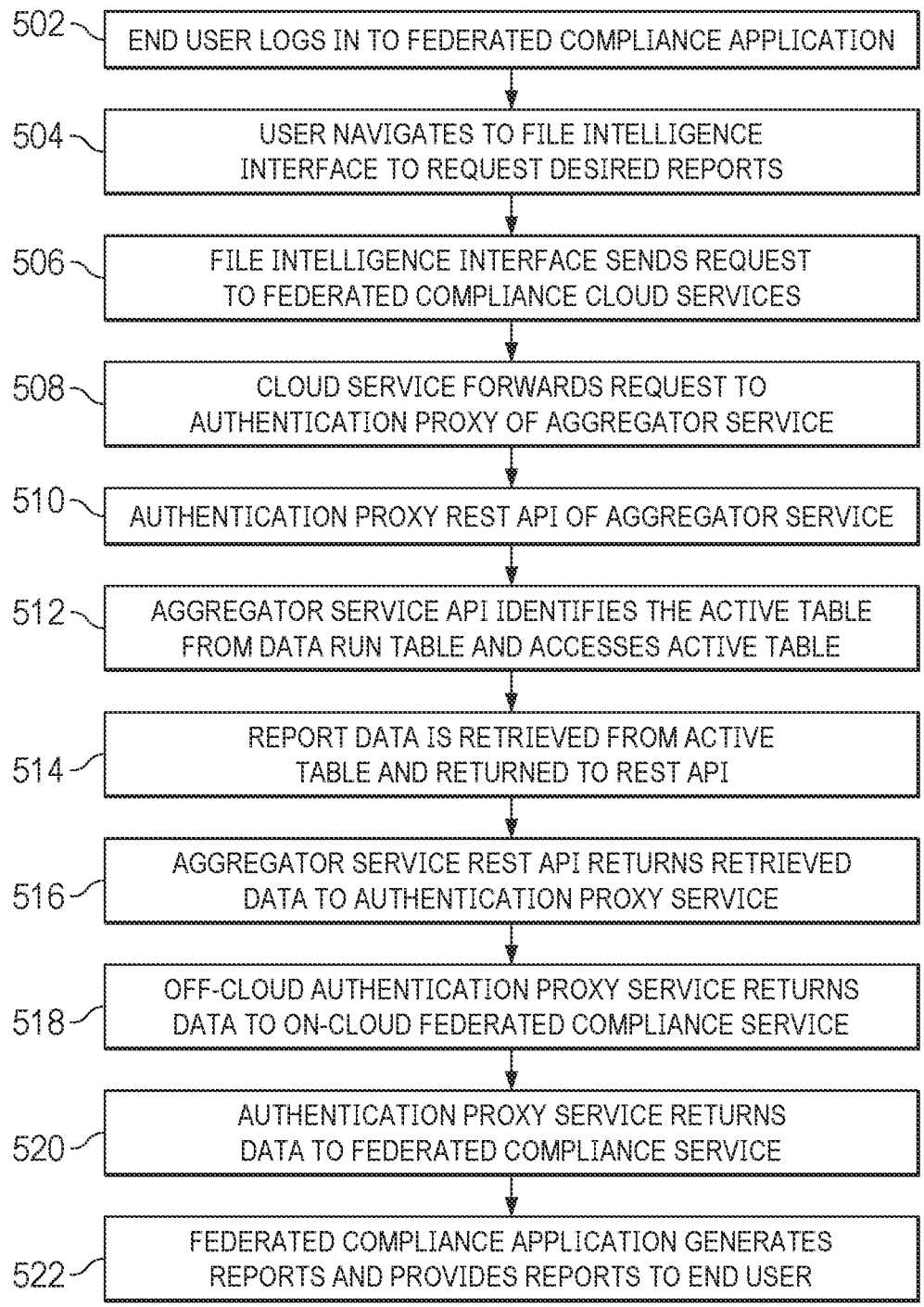
FIG. 5 is a flow diagram illustrating an exemplary method for servicing requests for report data using an aggregator system in accordance with some embodiments.

Referring to FIG. 5, a flow diagram illustrating an exemplary method for servicing requests for report data using the aggregator system of FIG. 3 is shown. In this embodiment, an end user logs in to the federated compliance application (step 502). In the federated compliance application, the user navigates to an interface of the file intelligence component of the application and uses this interface to request one or more desired reports (step 504). The file intelligence interface then sends the request to the federated compliance cloud services to retrieve the data for the reports (step 506). Up to this point, the process is similar to previous processes.

Instead of passing the request to the off-cloud federated compliance cloud Rest API to initiate a search for the requested data, the cloud service forwards the request to an authentication proxy of the aggregator service (step 508). The authentication proxy of the aggregator service then calls a Rest API of the aggregator service (step 510), which reads the date run table to identify the active table for the report and accesses the active table (step 512). The data for the report is retrieved from the active table and is returned without the delay of having to search for the data (step 514). The Rest API of the aggregator service then returns the retrieved data to the authentication proxy service (step 516). The off-cloud authentication proxy service returns the data to the on-cloud federated compliance service (step 518), which returns the data through the file intelligence interface to the federated compliance application (step 520). The federated compliance application generates the requested reports using the received data and provides the reports to the end user (step 522).

Figure 6:
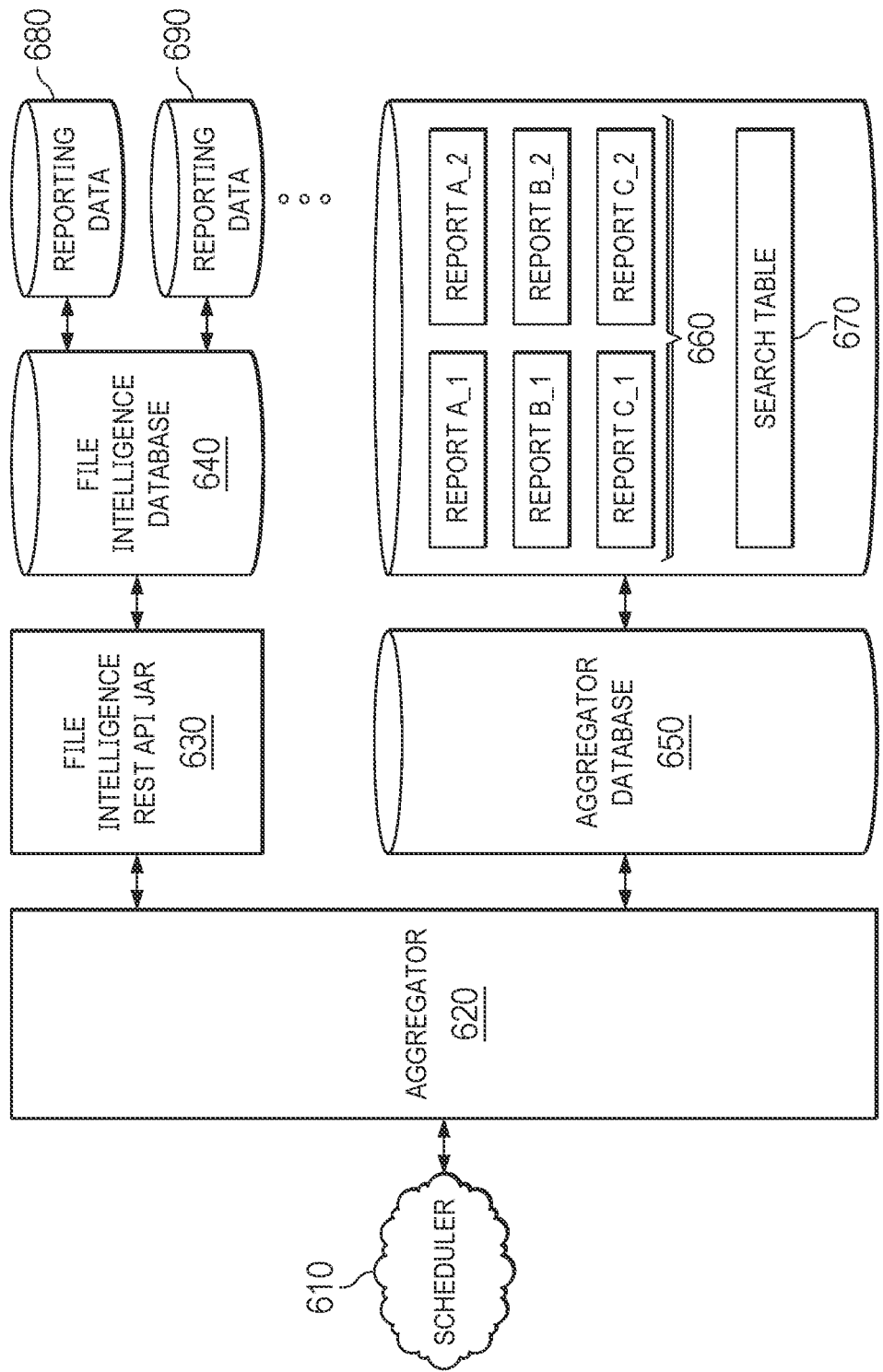
FIG. 6 is an exemplary embodiment of an aggregator system in accordance with some embodiments.

Referring to FIG. 6, an exemplary embodiment of an aggregator system in accordance with one embodiment is shown. In this embodiment, an aggregator service job scheduler 610 is configured to periodically initiate a request to search for and retrieve data for a set of reports. Job scheduler 610 may, for example, be configured to initiate a request every 24 hours. This interval may be configurable and may be different in other embodiments. The scheduler may also be configured to initiate the requests at non-regular intervals.

Job scheduler 610 initiates the request through an aggregator service Rest API 620. Aggregator service rest API 620 in turn accesses a file intelligence database 640 through file intelligence Rest API 630. The system accesses data stores 680, 690, etc. via file intelligence database 640. It should be noted that file intelligence API 630, file intelligence database 640 are components that existed in prior systems, while job scheduler 610, aggregator service API 620, aggregator service database 650 and tables 660 and 670 are new components which were not used in prior systems. Aggregator service API 620 is also configured to access aggregator service database 650. Aggregator service database 650 stores a set of tables 660 that are used to store data for corresponding reports, as well as a search table 670. The search table may also be referred to herein as a "date run" table, since it stores the date the search was run (e.g., in a timestamp).

The set of tables 660 includes two tables corresponding to each report. (The reports are configured via a file intelligence interface of the federated compliance service, which will be described in more detail below.) The two tables for a given report alternately contain immediately usable data. In other words, one of the tables contains a set of successfully stored data for the report (referred to herein as the "active" table), while the other (referred to herein as the "non-active" table) is empty and is used to store newly retrieved data for the report. Date run table 670 maintains an identifier of the one of the tables that contains the most recently (successfully) stored set of data.

Thus, when aggregator service API 620 receives data from file intelligence API 630 and this data is provided to aggregator service database 650, the database can identify from date run table 670 which of the report tables is the non-active table, and can store the retrieved data in this table. Until the newly retrieved data is completely and successfully stored in the non-active table, the active table is available to provide data responsive to any requests for report data. When the data for the report has been successfully stored in the non-active table, aggregator service database 650 can update date run table 670 to indicate that the non-active table is now the active table (and that the previously active table is now the non-active table). In one embodiment, the data for each of the reports must be successfully stored into the corresponding non-active table before the active/non-active status for all of the tables (which is the same) is changed. In other embodiments, it may be possible to handle each pair of tables separately, so that the active/non-active status of the pair of tables for a first report may be changed independently of the active/non-active status of the of tables for a second report.

Referring to FIG. 7, an exemplary structure of date run table 670 is shown. This structure is intended to be illustrative of the information that is maintained in the date run table, and may vary in other embodiments. In this example, date run table 670 includes fields for an identifier 710, a timestamp 720, a repository type 730, a status 740, and an active table identifier 750. Identifier 710 identifies the particular search/retrieval transaction which is being performed to update the report tables, and can be any suitable type of identifier. Timestamp 720 is a timestamp corresponding to the search/retrieval transaction. In this embodiment, the timestamp corresponds to the time at which the transaction was completed or terminated. In some embodiments, when a search/retrieval transaction is initiated, the timestamp will indicate the time at which the transaction was initiated, and the status indicator 740 will indicate that the transaction is in-progress. Repository type 730 identifies the type of repository from which the report data is retrieved. Status 740 is an indicator of whether or not the search/retrieval transaction was completed successfully. Active table identifier 750 indicates which of the tables is active (and by implication which of the tables is non-active. In this example, the table identifier 750 indicates which of the tables was active at initiation of the search/retrieval transaction. It can be seen that, if a particular search/retrieval transaction is a failure, the active table remains the same in the next entry in the date run table.

Figure 8:
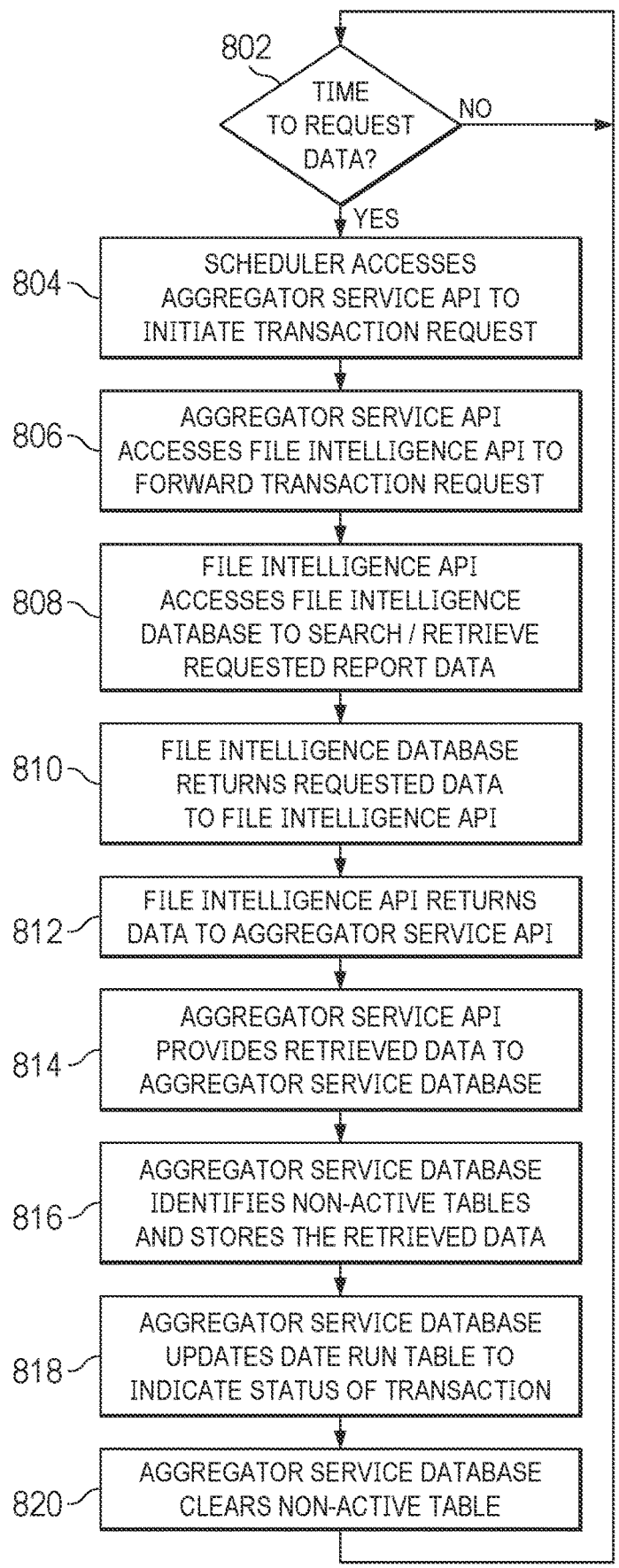
FIG. 8 is a flow diagram illustrating an exemplary method for updating report data using an aggregator system in accordance with some embodiments.

Referring to FIG. 8, a flow diagram illustrating an exemplary method for updating report data using the aggregator system of FIG. 6 is shown. At step 802, the aggregator service job scheduler determines whether it is time to initiate a scheduled search/retrieval transaction. At step 804, the scheduler initiates the transaction by accessing the aggregator service API with the transaction request. At step 806, the aggregator service API accesses the file intelligence API to forward the transaction request. At step 808, the file intelligence API accesses the file intelligence database to search for and retrieve the requested report data. At step 810, the file intelligence database returns the requested data to the file intelligence API, which then returns the data to the aggregator service API (at step 812). At step 814, the aggregator service API provides the retrieved data to the aggregator service database. At step 816, the aggregator service database identifies the non-active tables and stores the retrieved data in the non-active tables for the corresponding reports. At step 818, the aggregator service database updates the date run table to indicate the status of the transaction. At step 820, the aggregator service database clears whichever of the tables is now non-active (i.e., if the transaction is successful, it clears the previously active and now non-active table, and if the transaction has failed, it clears the currently non-active table).

Thus, using the steps described above, the aggregator service maintains, for each of the configured reports, a corresponding pair of report tables. One of the tables in the pair (the active table) always contains the results of the most recent successful search for report data. The other table (the non-active table) is either cleared and available to store newly obtained data, or is being used to store data that is currently being obtained.

In this embodiment, the system searches for and updates all of the tables at the same time. The search for an individual report's data need not be concurrent with searches for other reports' data, but in this embodiment the data for all of the reports is obtained and the corresponding non-active tables are updated before the system updates the identification of which set of tables is active. In alternative embodiments, the aggregator system may search and update individual tables and change them to active status individually, rather than as a group.

Since one of the sets of tables maintained by the aggregator service is always active and contains the data from the most recent successful search, the aggregator can always be accessed to obtain data for a desired report. The data is immediately available from the active table for the report. The process of accessing the data is the same for the cloud-based components as in previous systems, but the off-cloud process differs from previous methods in that the request for data is passed to the aggregator service, which obtains the data from the active table(s) rather than having to subsequently perform a search for the data, or wait for a pending search to be completed before being able to return the requested data. This avoids the delays that can cause the request to time out, or cause the user to assume that the request has not been successfully processed.

The described systems and methods provide a number of advantages over previous processes. For example, as noted above, the use of data which is immediately retrievable from an active table for a report avoids delays that are inherent in searches that are initiated in response to a request for the desired data. This avoids timeouts and user cancellation of requests which may result from the delays. The system's use of two tables (active and non-active) and switching the non-active table to the active state after completion and verification that the corresponding data has been successfully stored improves performance because the newly stored data is made available immediately when the status is updated, without any downtime. Since the data from the now non-active table is cleared after the status is updated, there is no storage of historical information, reducing resource usage. Further, the use of a separate table for each report increases the efficiency of retrieving the data for each report.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like.

Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for data reporting comprising:
a data aggregator; and
a data retrieval tool coupled to the data aggregator;
the data aggregator adapted to store two sets of data reporting tables, the data aggregator designating a first one of the sets of data reporting tables as an active set and the second one of the sets of data reporting tables as a non-active set, wherein the active set of tables stores data corresponding to a most recently successfully completed search, and wherein the non-active set stores data corresponding to a current search, wherein in response to successful completion of the current search, the data aggregator designates the non-active set as the active set;
the data retrieval tool, the data retrieval tool adapted to receive search requests from the data aggregator, retrieve data corresponding to each of the search requests from one or more data sources coupled to the data retrieval tool, and return to the data aggregator the retrieved data corresponding to each received search request;
the data aggregator adapted to receive data requests and, for each of the received data requests, identify the active set of data reporting tables containing requested data, retrieve the requested data from the active set of data reporting tables, and provide the requested data responsive to the data request.

2. The system of claim 1, wherein the data retrieval tool comprises a file intelligence service, the file intelligence service adapted to provide an application program interface (API) and to receive the search requests from the data aggregator via the API.

3. The system of claim 2, the file intelligence service adapted to store in a file intelligence database one or more tables identifying the one or more data sources, the file intelligence service retrieving the data corresponding to the search requests from the one or more data sources identified by the one or more tables.

4. The system of claim 1, wherein the data aggregator is adapted to store in a search table a record corresponding to each search request, the record indicating at least a time at which the search corresponding to the search request was run; wherein the data aggregator is further adapted to store in each record in the search table an indicator of success or failure of the corresponding search; and wherein the data aggregator is further adapted to store in each record in the search table an indicator of the active set of tables following completion of the corresponding search.

5. The system of claim 1, wherein the data aggregator is adapted to, following designation of the non-active set as the active set, clear the previously active set of tables.

6. The system of claim 1, further comprising a scheduler coupled to the data aggregator, the scheduler adapted to store a set of reporting jobs, each reporting job identifying one or more corresponding data requests and one or more scheduled times for the data requests, the scheduler further adapted to initiate each of the data requests with the data aggregator at scheduled times corresponding to the data requests.

7. The system of claim 6, wherein one or more of the data requests is repeatedly initiated at intervals determined by corresponding ones of the reporting jobs.

8. The system of claim 1, wherein the data sources comprise two or more distinct data stores that are remote from the data aggregator.

9. The system of claim 8, wherein the data sources comprise both cloud-based and off-cloud data stores.

10. The system of claim 1, wherein the two sets of data reporting tables are stored in a data store local to the data aggregator.

11. The system of claim 1, wherein the data aggregator is adapted to store one or more search configurations, each search configuration defining parameters for a corresponding one of the search requests, wherein in response to initiation of a data request, the data aggregator is adapted to provide a corresponding one of the search requests to the data retrieval tool according to the corresponding search configuration.

12. The system of claim 1, wherein the data aggregator is adapted to store one or more report configurations, each report configuration defining parameters for a corresponding data report based on a corresponding data request, wherein a report is generated according to the corresponding report configuration in response to receiving the requested data.

13. A method for data reporting comprising:
storing, by a data aggregator, two sets of data reporting tables;
designating, by the data aggregator, a first one of the sets of data reporting tables as an active set and the second one of the sets of data reporting tables as a non-active set, the active set of tables storing data corresponding to a most recently successfully completed search, and the non-active set storing data corresponding to a current search;
designating, by the data aggregator in response to successful completion of the current search, the non-active set as the active set;
receiving, by a data retrieval tool, search requests from the data aggregator;
retrieving, by the data retrieval tool, data corresponding to each of the search requests from one or more data sources coupled to the data retrieval tool;
returning to the data aggregator the retrieved data corresponding to each received search request;
receiving, by the data aggregator, data requests; and
for each of the received data requests, identifying the active set of data reporting tables containing requested data, retrieving the requested data from the active set of data reporting tables, and providing the requested data responsive to the data request.

14. The method of claim 13, wherein the data retrieval tool comprises a file intelligence service, the method further comprising:
providing, by the file intelligence service, an application program interface (API);
receiving, by the file intelligence service, the search requests from the data aggregator via the API;
storing, by the file intelligence service, one or more tables identifying the one or more data sources in a file intelligence database; and
retrieving, by the file intelligence service, the data corresponding to the search requests from the one or more data sources identified by the one or more tables.

15. The method of claim 13, storing, by the data aggregator, a record corresponding to each search request in a search table, the record indicating at least a time at which the search corresponding to the search request was run, an indicator of success or failure of the corresponding search, and an indicator of the active set of tables following completion of the corresponding search.

16. The method of claim 13, further comprising:
storing, by a scheduler coupled to the data aggregator, a set of reporting jobs, each reporting job identifying one or more corresponding data requests and one or more scheduled times for the data requests; and
initiating, by the scheduler, each of the data requests with the data aggregator at scheduled times corresponding to the data requests.

17. A computer program product for data reporting comprising a non-transitory computer-readable medium storing instructions executable by one or more processors to perform:
storing two sets of data reporting tables;
designating a first one of the sets of data reporting tables as an active set and the second one of the sets of data reporting tables as a non-active set, the active set of tables storing data corresponding to a most recently successfully completed search, and the non-active set storing data corresponding to a current search;
designating, in response to successful completion of the current search, the non-active set as the active set;
receiving search requests from the data aggregator;
retrieving data corresponding to each of the search requests from one or more data sources coupled to the data retrieval tool;
returning, responsive to the search requests, the retrieved data corresponding to each received search request;
receiving data requests; and
for each of the received data requests, identifying the active set of data reporting tables containing requested data, retrieving the requested data from the active set of data reporting tables, and providing the requested data responsive to the data request.

18. The computer program product of claim 17, wherein the data is retrieved by a file intelligence service, the instructions further executable by the one or more processors to perform:
providing an application program interface (API);
receiving the search requests from the data aggregator via the API;
storing one or more tables identifying the one or more data sources in a file intelligence database; and
retrieving the data corresponding to the search requests from the one or more data sources identified by the one or more tables.

19. The computer program product of claim 17, the instructions further executable by the one or more processors to perform storing a record corresponding to each search request in a search table, the record indicating at least a time at which the search corresponding to the search request was run, an indicator of success or failure of the corresponding search, and an indicator of the active set of tables following completion of the corresponding search.

20. The computer program product of claim 17, the instructions further executable by the one or more processors to perform:
executing a scheduler storing a set of reporting jobs, each reporting job identifying one or more corresponding data requests and one or more scheduled times for the data requests; and
the scheduler initiating each of the data requests with the data aggregator at scheduled times corresponding to the data requests.

* * * * *